H. RUHNAU.
APPARATUS FOR MAKING MULTIPLE THREADED WOOD SCREWS.
APPLICATION FILED MAY 12, 1909.

981,478.

Patented Jan. 10, 1911.

UNITED STATES PATENT OFFICE.

HERMANN RUHNAU, OF ERNSBACH, GERMANY.

APPARATUS FOR MAKING MULTIPLE-THREADED WOOD-SCREWS.

981,478.  Specification of Letters Patent.  Patented Jan. 10, 1911.

Application filed May 12, 1909. Serial No. 495,503.

*To all whom it may concern:*

Be it known that I, HERMANN RUHNAU, a citizen of the German Empire, residing at Ernsbach, in the Kingdom of Würtemberg, Empire of Germany, have invented certain new and useful Improvements in Apparatus for Making Multiple-Threaded Wood-Screws; and I do hereby declare the following to be a full, clear, and exact description of the invention, such as will enable others skilled in the art to which it appertains to make and use the same.

This invention relates to the manufacture of multiple threaded wood screws and consists in the apparatus devised by me for use in the manufacture of such screws.

In my improved method of making screws, the tool is fed forwardly so as to form the single thread upon the screw, and returned and fed forwardly a second or third time according to the number of threads to be made in the blank space between the threads.

The invention will now be more particularly described with reference to the accompanying drawing, in which a machine for carrying out the method is shown as an example:—

Figure 1:
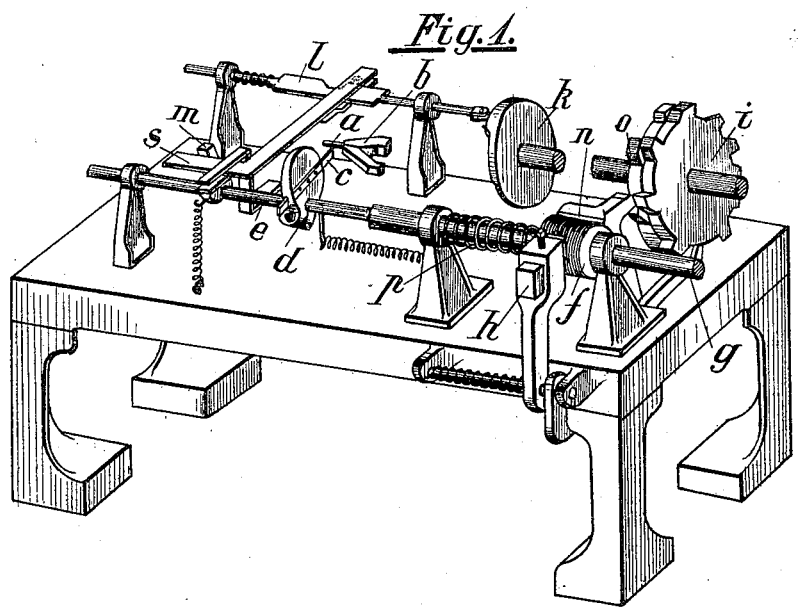
Figure 2:
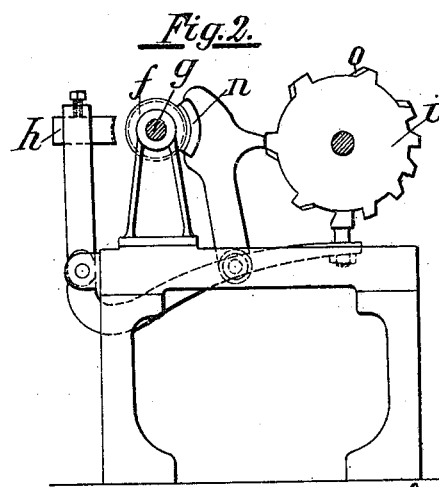

Figure 1 is a diagrammatic perspective view of an apparatus embodying my invention. Fig. 2 is an end view of same showing the alternate action of two dies.

In screw cutting machines heretofore employed, the work piece $a$ or prepared screw pin is conveyed automatically to a clamp $b$ which is rotated from the machine driving gear at the required number of revolutions. For forming the threads upon the prepared pin, I employ a cutter $c$ which may have one or more cutting edges, and is held within a tool holder $d$ arranged on a spindle $e$ and capable of being moved longitudinally, and turned until the same is brought into engagement with the work piece $a$. The feeding of the spindle forward is accomplished by a guide $f$ arranged on a continuously rotated spindle $g$ connected with the axis $e$ on the cutter holder, in such a manner that a cutter can be fed forwardly but not turned.

A swinging die is arranged for engaging the guide $f$ which is preferably formed cup shape having suitable threads adapted to be periodically brought into engagement with the guide $f$ by means of a cam $i$ which is driven from the driving gear of the machine, so that the guide and spindle $g$ are screwed to a certain extent forwardly in order to carry the cutter $c$, which at a suitable moment is brought into action by a cam $k$ pushing the same to and fro by means of a cam plate $l$, and a slide $s$ against which an arm $m$ mounted on the tool holder axis $e$ bears, in order to rotate the axis $e$ until the cutter $c$ comes into action, which will cut a thread upon the pin, as the same is simultaneously pushed forward. The number of revolutions of the clamp $b$ must be adapted to the traverse of the cutter $c$ so that a thread of the required pitch will be formed.

In the form of construction shown in Figs. 1—2, the feeding forward of the tool holder axis $e$ is accomplished by means of two dies $h$ and $n$, the first die $n$ being the ordinary die while the die $h$ is formed in a similar manner and works alternately with the first named die $n$ in order to bring the same alternately into engagement with the guide $f$. The nut $h$ in this construction is operated by a cam $o$ driven by the machine driving gear. The various movements being regulated in such a manner that during the removal of the finished screw and the insertion of a new work piece only one die is in engagement with the guide $f$, while the cutter $c$ makes several movements according to the duration of time without operating on the work piece. The die $n$ is then released and the guide $f$ and cutter $c$, are returned by a spring $p$ after the cutter has been thrown out of engagement. The other die $h$ is then brought into engagement with the guide $f$ and the cutter $c$ is thrown into action again so as to cut a second thread in the blank portion of the pin. By constructing the cam $k$ in a certain manner, the point of the screw is then shaped as in the ordinary manner.

What I claim is:—

An apparatus for making double threaded wood-screws comprising a cutting tool, a rotary screw spindle for feeding the cutter tool forward, a cam operated die periodically engaging said spindle for forming the first thread upon the screw, and a second cam operated die for periodically engaging the screw of the spindle for feeding the same forwardly for forming the second thread upon the screw.

In testimony whereof I affix my signature, in presence of two witnesses.

HERMANN RUHNAU.

Witnesses:
   JEAN GULDEN,
   HERMANN HOPPE.